A. THOMPSON.
Rotary Cultivator.
No. 58,319. Patented Sept. 25, 1866.
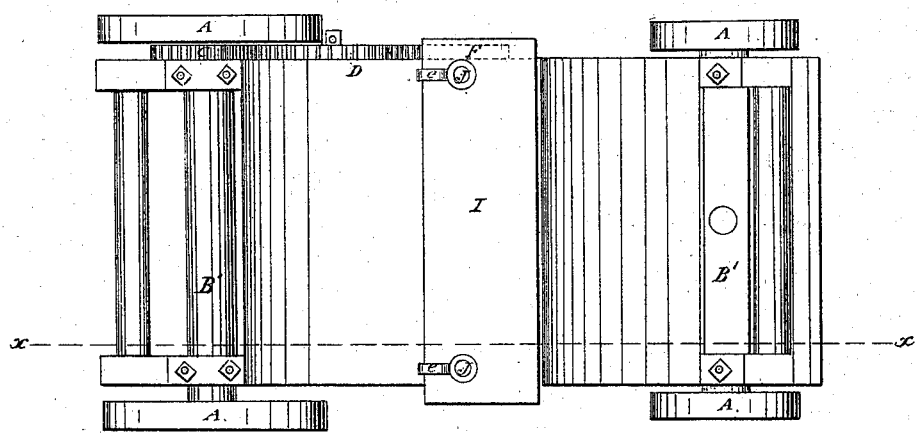
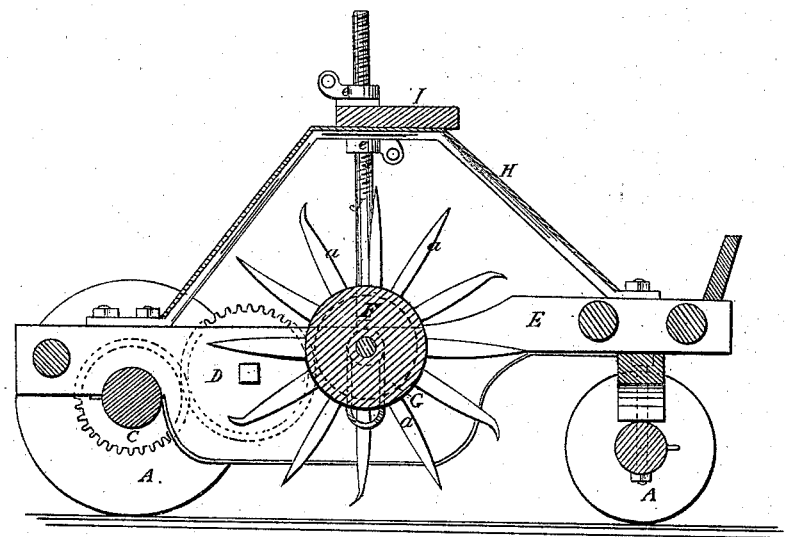
Witnesses:
Inventor:

UNITED STATES PATENT OFFICE.

ANDREW THOMPSON, OF OTTUMWA, IOWA.

IMPROVEMENT IN ROTARY CULTIVATORS.

Specification forming part of Letters Patent No. 58,319, dated September 25, 1866.

*To all whom it may concern:*

Be it known that I, ANDREW THOMPSON, of Ottumwa, in the county of Wapello and State of Iowa, have invented a new and Improved Rotary Cultivator; and I do hereby declare that the following is a full, clear, and exact description thereof, which will enable those skilled in the art to make and use the same, reference being had to the accompanying drawings, forming part of this specification.

The nature of this invention consists in constructing a pulverizer in such a manner that the teeth revolve upon the ground and are so constructed that the cylinder in which the teeth are secured can be elevated or lowered, thus gaging the teeth to any desired depth.

The advantages of this invention over the common plow or cultivator for pulverizing ground preparatory to receiving the seed are obvious, from the fact that the ground is put in much better condition for the seed than can possibly be done with the plow, and with much less power, and easier for the laborer, as he can ride and perform his work much easier than to follow and hold the plow.

This invention more particularly consists in constructing a cylinder in which are secured suitable teeth that are set spirally around the cylinder. The cylinder is set or is hung in pendent strips or rods, so that it may be elevated or lowered, as desired, by means of screws upon the said rods, which are attached to braces and frame, which is mounted on four wheels; and the cylinder is driven or made to revolve by means of suitable gears from one of the traction-wheels, making it one of the cheapest and most effective pulverizers now in use, and is not liable to get out of order.

Figure 1 is a top plan view of my improved revolving pulverizer. Fig. 2 is a longitudinal vertical sectional elevation of the same from the line *x x*.

Letters of like name and kind refer to like parts in each of the figures.

A' A in the drawings may represent four wheels, of common construction and of any desired dimensions, that run on axles B B'. The wheels on the axle B are made fast, and the axle revolves with the wheels, while upon the forward axle, B', the wheels revolve upon the axle.

Upon the axle B is a gear-wheel, C, that fits and meshes into a corresponding gear-wheel, D, that runs upon a bearing secured to the outside of the frame E. This wheel D also fits and meshes into a corresponding pinion, F, that is secured upon the outer end of the shaft of the cylinder G.

The frame E is mounted on the axles B B', and is made of wood, and connects both axles, between which the said frame curves down and approximates the ground. In this curve, and about the center, between the wheels, is a vertical slot, in which is placed and in which works the bearings of the cylinder G.

This cylinder G may be made of wood or metal, and the teeth set in a spiral direction around the said cylinder at such distances as may be desired.

*a* represents the teeth, which may be made of steel and in such form as may be desired. The form as shown in the drawings I prefer, and find to be the most effective pulverizer.

H represents a crown-brace that is secured to the top and near each end of the frame E, and in the crown is elevated to a height sufficient for the driver's seat, which is represented by I. There are two of the braces represented by H, one secured to each side of the frame.

From the crown of the braces H are rods J J suspended, that extend down into the slot in the frame E. In these rods J J are bearings provided, in which run the journals of the cylinder G. These said rods J J are provided with screws at the upper end, so that they may be adjusted to any desired height by means of screw-nuts *e e*.

K represents a covering, that may be made of wood, sheet metal, or other suitable material, that extends up and over the crown-braces H H to protect the driver and other persons from the teeth of the cylinder.

The forward axle, or the axle B', is pivoted by a king-bolt, so that the wheels may turn similar to a common wagon, to render it convenient when turning around.

The operation of my invention is simple, easy, and effective, and peculiarly adapted to ground where there are no stones, and to maimed persons, as they can operate, when they could not the common plow.

The team is attached to a pole in the ordinary manner, and as they proceed across the field the traction-wheels upon the rear axle are put in motion, and, through the medium of the gear-wheels, the cylinder in which are the teeth, that penetrate the ground to the depth to which they are set and pulverize it in the most complete and perfect manner.

Having thus described my invention, what I claim as new, and desire to secure by Letters Patent, is—

1. The pendent rods J J, provided with bearings for the cylinder G, said bearings being guided in slots in the frame E, for the purposes and substantially as herein shown and described.

2. The revolving cylinder, in combination with the pendent rods J J and crowned braces H H, substantially as and for the purpose herein shown.

3. The frame E, provided with the slots which guide the bearings of the pendent rods J J and braces H H, substantially as herein shown.

The above specification of my invention signed by me this 11th day of July, 1866.

ANDREW THOMPSON.

Witnesses:
   G. A. DERBY,
   JOHN POTTER.